(12) United States Patent
Liao

(10) Patent No.: US 7,580,256 B2
(45) Date of Patent: Aug. 25, 2009

(54) HOOK STRUCTURE

(75) Inventor: Shu Hsien Liao, Taipei (TW)

(73) Assignee: Twinhead International Corp., Taipei (TW)

( * ) Notice: Subject to any disclaimer, the term of this patent is extended or adjusted under 35 U.S.C. 154(b) by 0 days.

(21) Appl. No.: 11/840,554

(22) Filed: Aug. 17, 2007

(65) Prior Publication Data

US 2008/0055838 A1 Mar. 6, 2008

Related U.S. Application Data

(60) Provisional application No. 60/824,550, filed on Sep. 5, 2006.

(51) Int. Cl.
*H05K 5/00* (2006.01)
*H05K 7/00* (2006.01)

(52) U.S. Cl. .............................. 361/679.58; 361/679.55

(58) Field of Classification Search .......... 361/679–683
See application file for complete search history.

(56) References Cited

U.S. PATENT DOCUMENTS

| | | | | |
|---|---|---|---|---|
| 5,253,142 A | * | 10/1993 | Weng | 361/681 |
| 6,034,867 A | * | 3/2000 | Seo | 361/683 |
| 2003/0011972 A1 | * | 1/2003 | Koo | 361/681 |
| 2006/0002062 A1 | * | 1/2006 | Kwon et al. | 361/680 |
| 2007/0070593 A1 | * | 3/2007 | Wu et al. | 361/683 |
| 2007/0171604 A1 | * | 7/2007 | Hong et al. | 361/683 |

* cited by examiner

*Primary Examiner*—Jayprakash N Gandhi
*Assistant Examiner*—Anthony M Haughton
(74) *Attorney, Agent, or Firm*—Rosenberg, Klein & Lee

(57) ABSTRACT

A hook structure is disclosed in the invention, which can be implemented to a housing for a monitor in a portable electronic device. The housing is comprised of a front cover and a rear cover, and the hook structure comprises at least a buffer material, hook bodies, and pressing plates. The buffer material is disposed at an inner side of the front cover and is adjacent to a through opening; each hook body has a first horizontal plate and a second horizontal plate; a lateral edge of the first horizontal plate extends into a fastening hook and penetrates through the through opening, so that the second horizontal plate is pressed tightly against the buffer material around the through opening. Each pressing plate is used to press against the second horizontal plate, so that each hook body is fixed onto the front cover inside of the housing.

7 Claims, 5 Drawing Sheets

HOOK STRUCTURE

FIELD OF THE INVENTION

The invention relates to a hook structure for being implemented to a housing for a monitor in a portable electronic device, and more particularly to a hook structure that uses a buffer material for absorbing instantaneous shear stress and protecting the hook structure.

DESCRIPTION OF PRIOR ART

With the constant advances in technology and manufacturing techniques, the electronic products must not only be constantly improved in terms of functions and quality, but also miniaturized in physical size as well, so that the products are convenient to carry around. This is especially true for the laptop computers, as every maker of the laptop computers strive to minimize the physical size thereof in order to satisfy such demands from the consumers. However, the makers of the laptop computers try to achieve the goal by investing an enormous amount of manpower and budget, in an attempt to shrink the physical size of the electronic components inside of the laptop computers without affecting the functions thereof, or even adding more functions into the electronic components. While this approach may be likely to achieve the goal, the time, labor, and cost required for such approach are relatively higher.

Referring to FIG. 1, which shows a three-dimensional view that shows a laptop computer of the prior arts. A generic laptop computer 1 similar to the latest laptop computers is shown in the drawing, which comprises a housing 11 for receiving a monitor pivotally connected to a main housing 13; the housing 11 includes a front cover 111 and a rear cover 113, and the front cover 111 and the rear cover 113 enclose and hold a LCD monitor 115; two hook mechanisms 2 are disposed on a lateral edge of the housing 11 away from the pivotal connection with the main housing 13, and a retaining groove 131 is concavely disposed on positions of the main housing 13 corresponding to the two hook mechanisms 2, respectively. When the housing 11 is pressed toward the main housing 13 and thus allowing the two housings to become closed together, the two hook mechanisms 2 are correspondingly retained in the retaining grooves 131, so that the laptop computer 1 may be shut and put away for storage. However, the laptop computer 1 shown in FIG. 1 has two hook mechanisms 2 and two corresponding retaining grooves 131, and in other designs of the laptop computers, a hook mechanism 2 and a corresponding retaining groove 131 may be disposed centrally on a front edge of a laptop computer to achieve the same purpose.

Referring to FIGS. 2 and 3, in which FIG. 2 is an exploded three-dimensional view that shows a hook mechanism of the prior arts, and FIG. 3 is a dissected view that shows a hook mechanism of the prior arts. Wherein two hook mechanisms 2 have a hook body 21, a touch component 23, and a spring 25, respectively. The hook body 21 is a rectangular block having a long passage 211 disposed through a center thereof; the hook body 21 has an aligning pin 213 extended from two shorter lateral sides thereof, respectively. The spring 25 may be fitted onto one of the aligning pin 213, while a hook 215 is disposed on one of two longer lateral sides of the hook body 21; each hook 215 corresponds to a retaining groove 131 and may be fastened thereto. The touch component 23 has a retaining surface 231 and a touch surface 233 that corresponds to the retaining surface 231, and four symmetrical latches 234 are disposed on the retaining surface 231; protrusions on the latches 234 face outwards, and the touch surface 233 is for users to press on.

In addition, a through opening 112 is formed on positions of the front cover 111 of the housing 11 corresponding to the hooks 215 of the two hook mechanisms 2; the through openings 112 are for the hooks 215 to pass through, thereby allowing the hooks 215 to slide within the through openings 112. Positions on the rear cover 113 of the housing 11 that correspond to the two hook mechanisms 2 are also configured accordingly, which has limiting blocks 114 disposed on the rear cover 113 that corresponds each of the aligning pins 213; through openings 116 are disposed through the limiting blocks 114, and the through openings 116 allow the corresponding aligning pins 213 to penetrate therethrough. A sliding groove 118 is disposed through the long passage 211 of the rear cover 113 that corresponds to the hook body 21, and the length of the sliding groove 118 is longer than that of the long passage 211.

With regard to assembling a set of hook mechanisms 2, the spring 25 is fitted onto one of the aligning pins 213 located at two sides of the hook body 21, and then the two aligning pins 213 are fitted into the through openings 116 of the corresponding limiting blocks 114, so that the long passage 211 of the hook body 21 is aligned with the sliding groove 118, and the four latches 234 on the touch surface 233 of the touch component 23 may pass through the sliding groove 118 and become fastened in the long passage 211, thereby aligning the hook body 21 and allowing the touch component 23 to have control over the hook body 21, and thus the hook body 21 may move along the axis of the aligning pin 213. Subsequently, the front cover 111 is pressed toward the rear cover 113 and the two covers become closed together, and the hook 215 of the hook body 21 is allowed to pass through the through opening 112 of the front cover 111. Therefore, the width of the sliding groove 118 must allow two latches 234 to pass through. When the laptop computer 1 is closed and a user is to open and use it, the user needs to press on the touch surface 233 and move toward the spring 25 to loosen the hook 215 of the hook body 21 from the retaining groove 131 of the main housing 13, and then the housing 11 may be pivotally rotated away from the main housing 13 to open the laptop computer 1. When the user intends to shut the laptop computer 1, just rotate the housing 11 pivotally to move the housing 11 toward the main housing 13, thereby allowing each of the hooks 215 to be received and retained in a corresponding retaining groove 131.

However, the hook mechanism 2 of the prior arts has the disadvantage of having many separate parts, and each of the parts require an individual mould for making, which not only costs more but also requires more time for assembly thereof. In addition, because the physical size of the laptop computer 1 is gradually reduced, the internal space inside of the main housing 13 and the housing 11 is reduced as a consequence. When the internal space inside of the housing 11 is smaller, the width of the front cover 111 and the rear cover 113 thereof must be reduced as well, and thus it is more difficult to form a sliding groove 118 that may allow two latches 234 to pass on lateral sides of the rear cover 113. Moreover, when the laptop computer 1 is shut and put away for storage; if an external force impacts on the laptop computer 1, the resulted shear stress often results in breakage of the hooks. To solve the aforesaid problems, the inventor of the invention has conducted research that culminated in the hook structure of the present invention.

SUMMARY OF THE INVENTION

An objective of the invention is to propose a hook structure, which may be implemented to a housing for a monitor in a portable electronic device, and more particularly to a hook structure that uses a buffer material for absorbing instantaneous shear stress and protecting the hook structure.

Therefore, to achieve the aforesaid objective, the hook structure of the invention may be implemented to a housing for a monitor in portable electronic devices, such as a laptop computer or a PDA. The housing comprises a front cover and a rear cover, and the hook structure has at least a buffer material, a hook body, and a pressing plate. The buffer material is disposed at an inner side of the front cover and is adjacent to a through opening; each hook body has a first horizontal plate and a second horizontal plate; a lateral edge of the first horizontal plate extends into a fastening hook and penetrates through the through opening, so that the second horizontal plate is pressed tightly against the buffer material around the through opening. Each pressing plate is used to press against the second horizontal plate, so that each hook body is fixed onto the front cover inside of the housing.

In addition, the hook structure of the invention has been effectively simplified in structure, and has a buffer material such as rubber, polyurethane, polyvinyl chloride, and silicon rubber for absorbing shear stress generated from moving the housing for a monitor and the main housing of the portable electronic device away from each other, so as to protect the hook body from breaking. The buffer material may be integrally formed, comprised of two pieces, or comprised of four pieces.

In order to allow anyone of ordinary skill in the art to better understand the technical content of the invention and carry out implementation thereof, a preferred embodiment of the invention and related drawings are provided to illustrate the details and advantages of the invention, so that the purposes and advantages of the invention are easily comprehended according to the disclosed contents, claims, and drawings thereof.

DETAILED DESCRIPTION OF PREFERRED EMBODIMENTS

The structure and the technical means adopted by the present invention to achieve the above and other objectives can be best understood by referring to the following detailed description of the preferred embodiments and the accompanying diagrams, wherein identical components are denoted by identical numbers.

Figure 1:
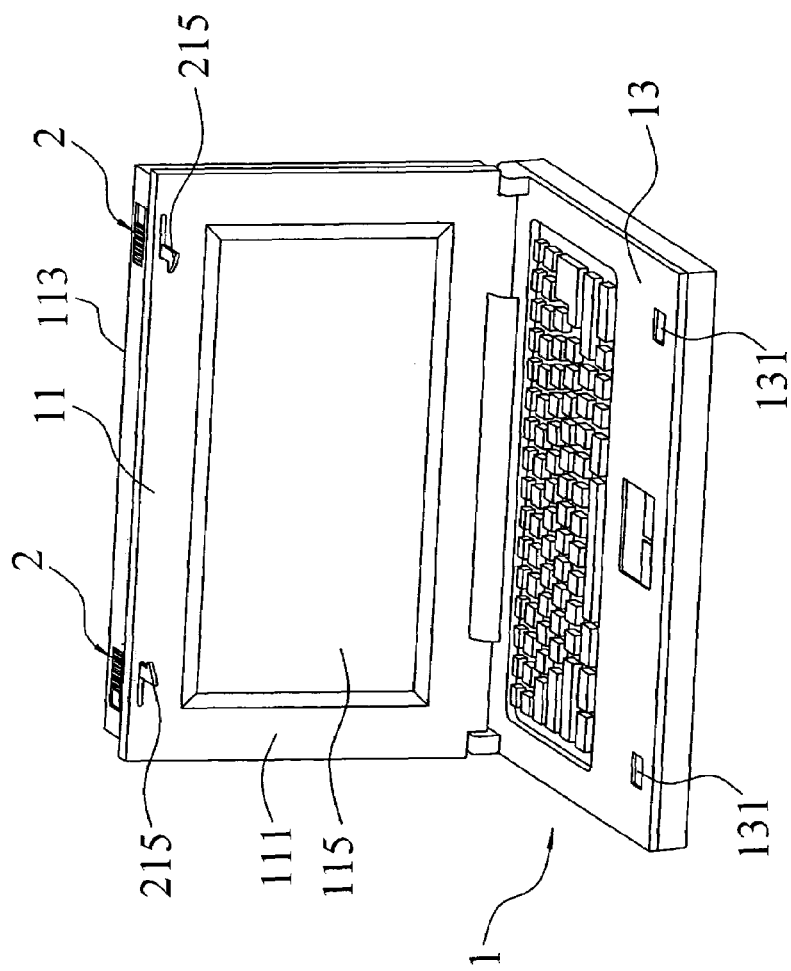
FIG. 1 is a three-dimensional view that shows a laptop computer of the prior arts.
Figure 2:
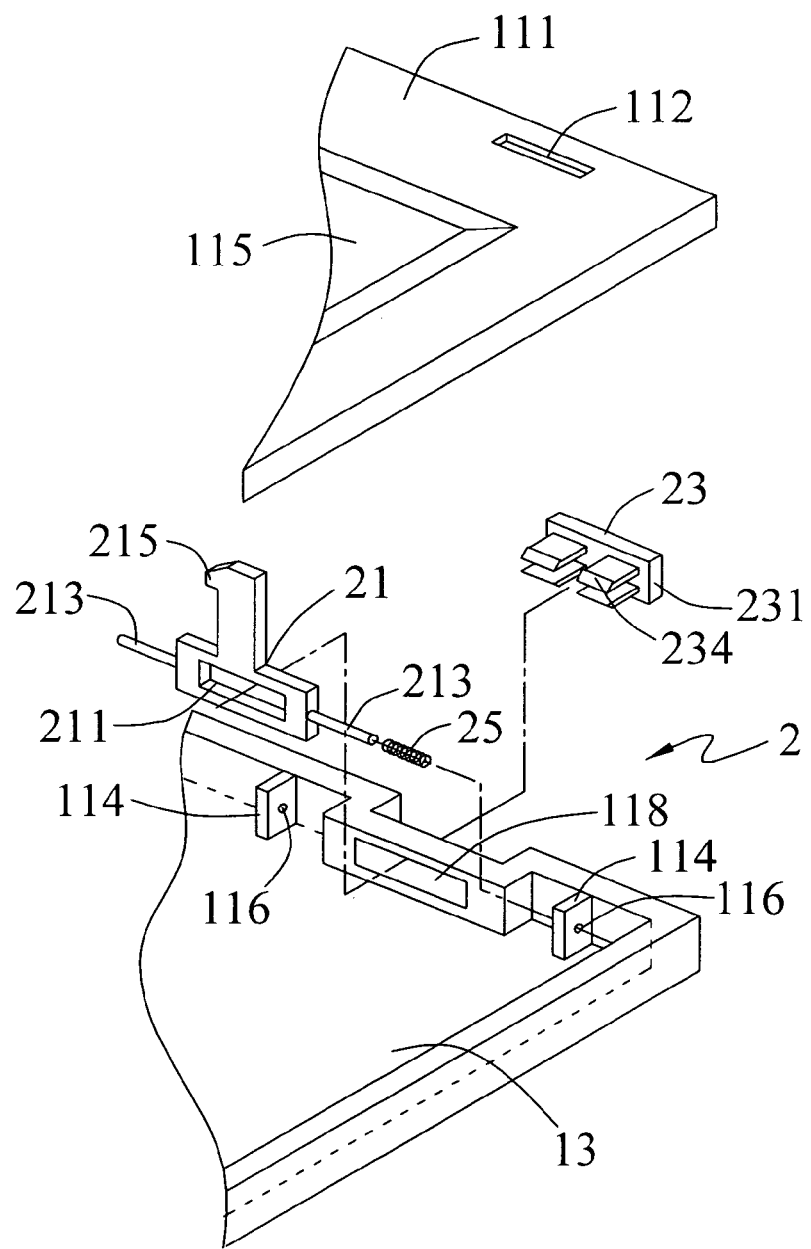
FIG. 2 is an exploded view that shows a hook mechanism of the prior arts.
Figure 3:
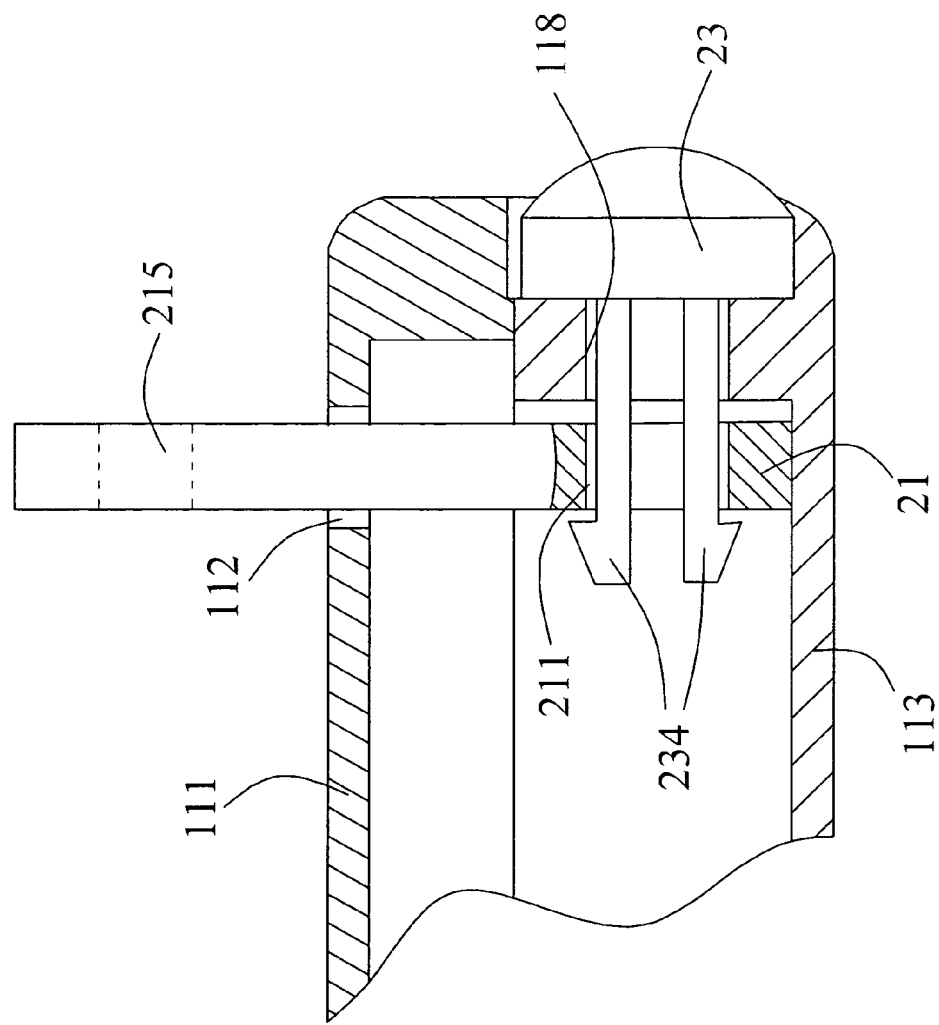
FIG. 3 is a dissected view that shows a hook mechanism of the prior arts.
Figure 4:
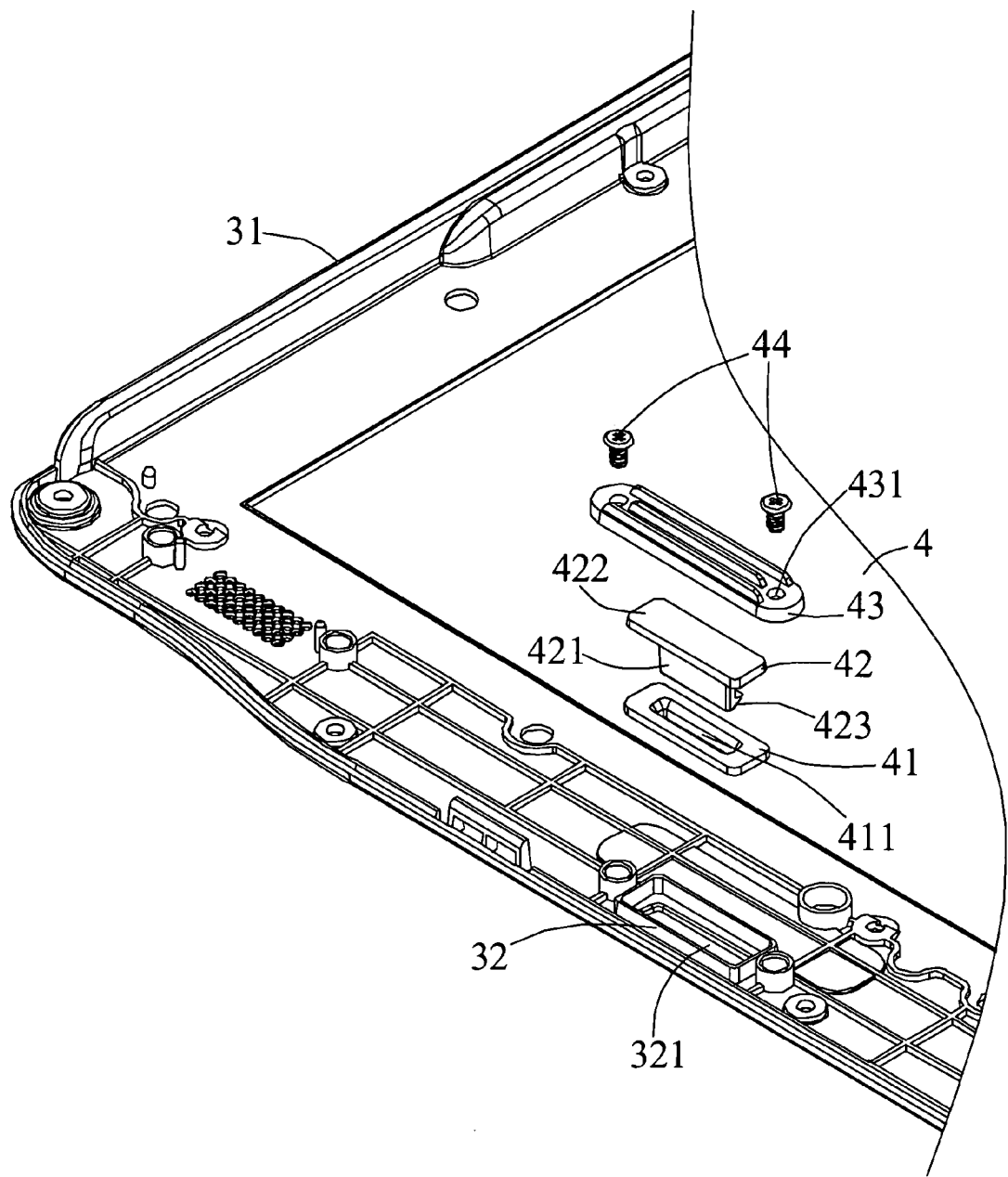
FIG. 4 is an exploded view that shows a hook structure of the invention comprising an integrally formed buffer material.

FIG. 4 is an exploded view that shows a hook structure of the invention comprising an integrally formed buffer material, wherein a hook structure 4 may be implemented to a housing for a monitor in a portable electronic device, and the housing comprises a front cover 31 and a rear cover (not shown in the drawing). The hook structure 4 comprises at least an integrally formed buffer material 41, a hook body 42, a pressing plate 43, and a plurality of fixing components 44. The buffer material 41 has a first through opening 411 disposed in a fastening groove 32 of the front cover 31, a second through opening 321 is disposed at bottom of the fastening groove 32, and the area of the second through openings 321 is equal to that of the first through opening 411, or is between the area of the first through opening 411 and the buffer material 41. The hook body 42 has a first horizontal plate 421 and a second horizontal plate 422; a lateral edge of the first horizontal plate 421 extends into a fastening hook 423, another lateral edge thereof that is away from the fastening hook 423 is connected to the second horizontal plate 422, so as to make the first horizontal plate 421 perpendicular to the second horizontal plate 422. The first horizontal plate 421 penetrates through the first through opening 411 and the second through opening 321, while the second horizontal plate 422 is tightly pressed against the buffer material 41. The area of the pressing plate 43 is larger than that of the fastening groove 32 and the pressing plate 43 has two holes 431. The pressing plate 43 presses tightly against the second horizontal plate 422, and the plurality of fixing components 44 penetrate through the holes 431, so as to fasten the pressing plate 43 on the front cover 31.

The aforesaid buffer material is preferably rubber, polyurethane, polyvinyl chloride, or silicon rubber, so as to absorb shear stress generated from moving the housing for a monitor and the main housing of the portable electronic device away from each other, and protect the hook body from breaking. The buffer material may be integrally formed, comprised of two pieces, or comprised of four pieces. A cross section of the integrally formed buffer material appears as "⌡⌠"-shaped, and the first holes are located on top of the "⌡⌠"structure; a cross section of the hook body appears as "T"-shaped, and the length of the first horizontal plate of the hook body is shorter than that of the second horizontal plate. Preferably, the fixing components may include screws. The hook structure of the invention is preferably implemented to portable electronic devices such as laptop computers or PDA. Moreover, the hook structure of the invention may have at least a buffer material disposed inside of the front cover and around the through openings; the first horizontal plate penetrates through the through openings so as to tightly press the second horizontal plate against the buffer material around the through openings. The pressing plate may be pressed tightly against the second horizontal plate via the fixing components, or fastened onto the front cover, or any other methods that may secure the pressing plate onto the front cover.

Figure 5:
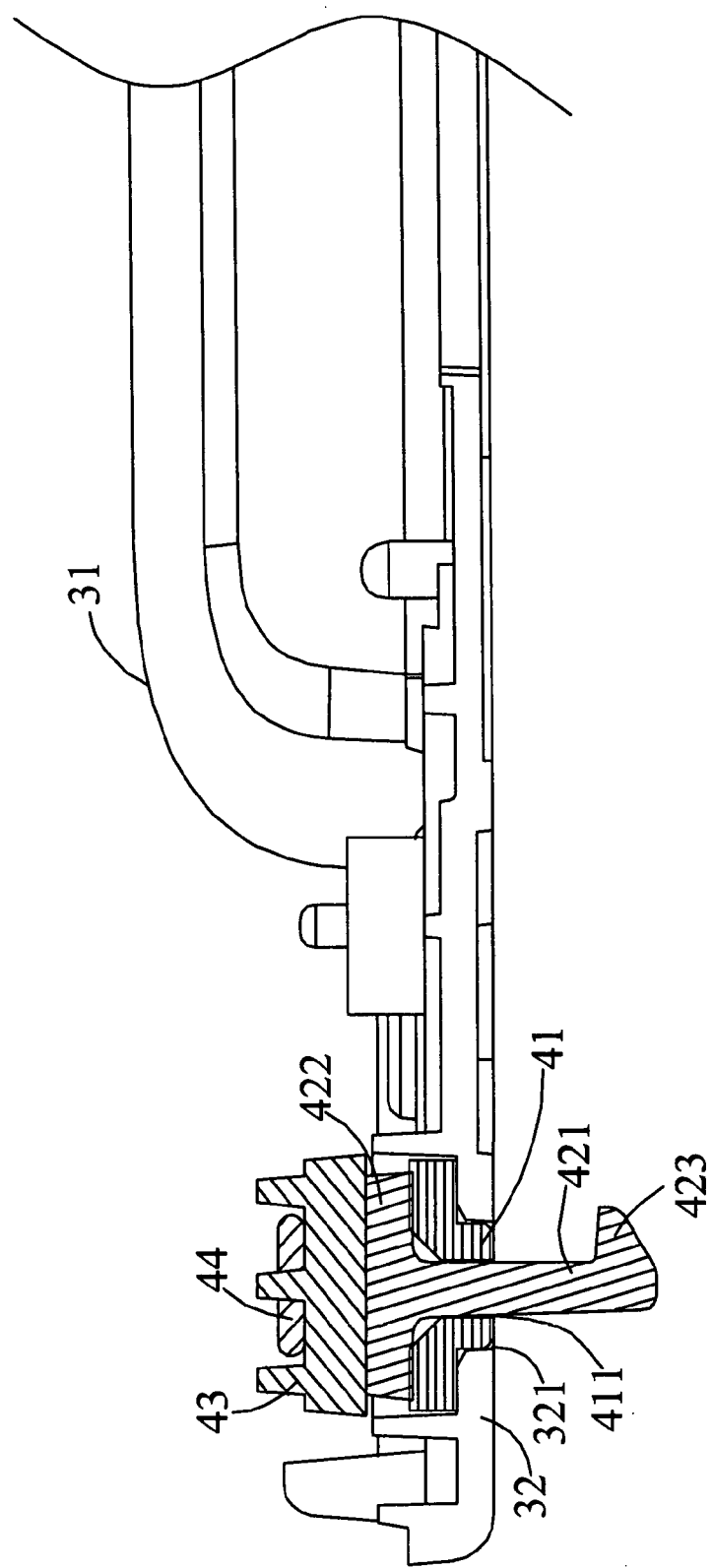
FIG. 5 is a dissected view that shows the hook structure of the invention shown in FIG. 4.

FIG. 5 is a dissected view that shows the hook structure of the invention shown in FIG. 4, wherein the buffer material 41 of the hook structure 4 has a first through opening 411 disposed in a fastening groove 32 of the front cover 31, a second through opening 321 is disposed at bottom of the fastening groove 32. The hook body 42 has a first horizontal plate 421 and a second horizontal plate 422; a lateral edge of the first horizontal plate 421 extends into a fastening hook 423, another lateral edge thereof that is away from the fastening hook 423 is connected to the second horizontal plate 422, so as to make the first horizontal plate 421 perpendicular to the second horizontal plate 422. The first horizontal plate 421 penetrates through the first through opening 411 and the second through opening 321, while the second horizontal plate 422 is tightly pressed against the buffer material 41. The pressing plate 43 has two holes 431 and presses tightly against the second horizontal plate 422, and the plurality of fixing components 44 penetrate through the holes 431, so as to fasten the pressing plate 43 on the front cover 31.

Although a preferred embodiment of the invention has been described for purposes of illustration, it is understood that various changes and modifications to the described embodiment can be carried out without departing from the scope and the spirit of the invention as disclosed in the appended claims.

What is claimed is:

1. A hook structure for being implemented to a housing for a monitor in a portable electronic device, and the housing being comprised of a front cover and a rear cover, the hook structure comprising:
   - at least a buffer material being disposed inside of the front cover, and surrounding a through opening;
   - a hook body having a first horizontal plate and a second horizontal plate, wherein a lateral edge of the first horizontal plate extends into a fastening hook, and another lateral edge thereof away from the fastening hook is connected to the second horizontal plate, and the first horizontal plate penetrates through the through opening so that the second horizontal plate is tightly pressed against the buffer material surrounding the through opening; and
   - a pressing plate for pressing tightly against the second horizontal plate, so as to secure the hook body on the front cover inside of the housing for a monitor, wherein said pressing plate is disposed entirely inside said front cover and wherein said pressing plate is fastened to a fastening groove.

2. The hook structure of claim 1, wherein a perimeter of the through opening of the front cover further includes said fastening groove, and the buffer material is disposed beneath the fastening groove.

3. The hook structure of claim 1, wherein the buffer material absorbs a shear stress generated from moving the housing for a monitor and the main housing of the portable electronic device away from each other.

4. The hook structure of claim 1, wherein the buffer material may be integrally formed, comprised of two pieces, or comprised of four pieces.

5. The hook structure of claim 4, wherein a cross section of the integrally formed buffer material has angles that are substantially normal.

6. The hook structure of claim 1, wherein a cross section of the hook body comprises a head part as the second horizontal plate and a body part as the first horizontal plate.

7. The hook structure of claim 1, wherein the portable electronic device includes a laptop computer or a PDA.

* * * * *